United States Patent
Wang et al.

(10) Patent No.: US 11,460,748 B2
(45) Date of Patent: Oct. 4, 2022

(54) MADE-TO-STOCK PATTERNED TRANSPARENT CONDUCTIVE LAYER

(71) Applicant: SAGE ELECTROCHROMICS, INC., Faribault, MN (US)

(72) Inventors: Yigang Wang, Maple Grove, MN (US); Jean-Christophe Giron, Edina, MN (US); Bryan D. Greer, Northfield, MN (US); Sebastian Marius Sarrach, Lakeville, MN (US); Thomas Doublein, Saint Paul, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 260 days.

(21) Appl. No.: 16/715,873

(22) Filed: Dec. 16, 2019

(65) Prior Publication Data

US 2020/0209701 A1 Jul. 2, 2020

Related U.S. Application Data

(60) Provisional application No. 62/786,004, filed on Dec. 28, 2018.

(51) Int. Cl.
*G02F 1/163* (2006.01)
*G02F 1/157* (2006.01)
*G02F 1/155* (2006.01)

(52) U.S. Cl.
CPC .............. *G02F 1/163* (2013.01); *G02F 1/155* (2013.01); *G02F 1/157* (2013.01); *G02F 2001/1552* (2013.01)

(58) Field of Classification Search
CPC .......... G02F 1/163; G02F 1/155; G02F 1/157; G02F 2001/1552; G02F 1/153

(Continued)

(56) References Cited

U.S. PATENT DOCUMENTS

| 5,724,175 A | 3/1998 | Hichwa et al. |
| 6,747,779 B1 | 6/2004 | Morin et al. |

(Continued)

FOREIGN PATENT DOCUMENTS

| CN | 107275007 A | 10/2017 |
| JP | H11-250733 A | 9/1999 |

(Continued)

OTHER PUBLICATIONS

International Search Report and Written Opinion for PCT/US2019/066590, dated Apr. 10, 2020, 12 pages.

(Continued)

*Primary Examiner* — Tuyen Tra
(74) *Attorney, Agent, or Firm* — Abel Schillinger, LLP; Robert N Young

(57) ABSTRACT

An electrochemical device and method of forming said device is disclosed. The method can include providing a substrate and stack overlying the substrate. The stack can include a first transparent conductive layer over the substrate, a cathodic electrochemical layer over the first transparent conductive layer, an anodic electrochemical layer over the electrochromic layer, and a second transparent conductive layer overlying the anodic electrochemical layer. The method can include depositing an insulating layer over the stack and determining a first pattern for the second transparent conductive layer. The first pattern can include a first region and a second region. The first region and the second region can be the same material. The method can include patterning the first region of the second transparent conductive layer without removing the material from the first region. The first region can have a first resistivity and the second region can have a second resistivity.

16 Claims, 7 Drawing Sheets

(58) Field of Classification Search
USPC .......................................... 359/265–275, 900
See application file for complete search history.

(56) References Cited

U.S. PATENT DOCUMENTS

| | | |
|---|---|---|
| 8,289,607 B2 | 10/2012 | Valentin et al. |
| 8,289,609 B2 | 10/2012 | Lamine et al. |
| 8,411,348 B2 | 4/2013 | Valentin et al. |
| 8,964,279 B2 | 2/2015 | Melcher et al. |
| 9,658,508 B1 | 5/2017 | Bass et al. |
| 9,677,327 B1 | 6/2017 | Nagel et al. |
| 2009/0304912 A1 | 12/2009 | Kwak et al. |
| 2009/0323156 A1 | 12/2009 | Shin et al. |
| 2012/0026573 A1 | 2/2012 | Collins et al. |
| 2012/0154892 A1 | 6/2012 | Yashiro et al. |
| 2014/0043668 A1 | 2/2014 | Bergh et al. |
| 2014/0204448 A1* | 7/2014 | Bergh ................ G02F 1/13439 359/275 |
| 2014/0205748 A1 | 7/2014 | Choi et al. |
| 2014/0272394 A1 | 9/2014 | Choi et al. |
| 2014/0338735 A1 | 11/2014 | Alemand et al. |
| 2015/0338713 A1* | 11/2015 | Brown ................ G02F 1/1523 359/275 |
| 2016/0011481 A1 | 1/2016 | Bergh et al. |
| 2016/0026055 A1 | 1/2016 | Choi et al. |
| 2016/0026057 A1 | 1/2016 | Choi et al. |
| 2016/0033837 A1 | 2/2016 | Bjornard et al. |
| 2016/0085127 A1 | 3/2016 | Choi et al. |
| 2016/0124282 A1 | 5/2016 | Choi et al. |
| 2016/0170278 A1 | 6/2016 | Bergh et al. |
| 2016/0170279 A1 | 6/2016 | Bergh et al. |
| 2016/0202588 A1 | 7/2016 | Bass et al. |
| 2016/0202589 A1 | 7/2016 | Nagel et al. |
| 2016/0202590 A1 | 7/2016 | Ziebarth et al. |
| 2016/0203403 A1 | 7/2016 | Nagel et al. |
| 2017/0002601 A1 | 1/2017 | Bergh et al. |
| 2017/0192332 A1 | 7/2017 | Roudebush et al. |
| 2017/0192333 A1 | 7/2017 | Bergh et al. |
| 2017/0278594 A1 | 9/2017 | Pellerite et al. |
| 2017/0371218 A1 | 12/2017 | Kailasam et al. |
| 2018/0011383 A1 | 1/2018 | Higashihara et al. |
| 2018/0196323 A1 | 7/2018 | Wang et al. |
| 2018/0252976 A1 | 9/2018 | Sarrach et al. |
| 2019/0146295 A1 | 5/2019 | Parker et al. |
| 2020/0301228 A1 | 9/2020 | Sarrach |
| 2021/0070653 A1 | 3/2021 | Couillard et al. |

FOREIGN PATENT DOCUMENTS

| | | |
|---|---|---|
| JP | 2003-249123 A | 9/2003 |
| JP | 2012-533776 A | 12/2012 |
| JP | 2014-021452 A | 2/2014 |
| JP | 2015-527615 A | 9/2015 |
| KR | 20170100568 A | 9/2017 |
| TW | 201626082 A | 7/2016 |
| TW | I615665 B | 2/2018 |
| TW | 201809842 A | 3/2018 |
| TW | 201937662 A | 9/2019 |
| WO | 2010120537 A2 | 10/2010 |
| WO | 2012/073288 A1 | 6/2012 |
| WO | 2014025900 A1 | 2/2014 |
| WO | 2019143646 A1 | 7/2019 |
| WO | 2020190979 A1 | 9/2020 |

OTHER PUBLICATIONS

International Search Report and Written Opinion for PCT/US2020/023219, dated Jul. 9, 2020, 11 pages.

* cited by examiner

MADE-TO-STOCK PATTERNED TRANSPARENT CONDUCTIVE LAYER

CROSS-REFERENCE TO RELATED APPLICATIONS

This application claims priority under 35 U.S.C. § 119(e) to U.S. Provisional Application No. 62/786,004, entitled "MADE-TO-STOCK PATTERNED TRANSPARENT CONDUCTIVE LAYER," by Yigang WANG et al., filed Dec. 28, 2018, which is assigned to the current assignee hereof and incorporated herein by reference in its entirety.

FIELD OF THE DISCLOSURE

The present disclosure is related to electrochemical devices and method of forming the same.

BACKGROUND

An electrochemical device can include an electrochromic stack where transparent conductive layers are used to provide electrical connections for the operation of the stack. Electrochromic (EC) devices employ materials capable of reversibly altering their optical properties following electrochemical oxidation and reduction in response to an applied potential. The optical modulation is the result of the simultaneous insertion and extraction of electrons and charge compensating ions in the electrochemical material lattice.

Advances in electrochromic devices seek to have faster and more homogeneous switching speeds while maintaining through-put during manufacturing.

As such, further improvements are sought in manufacturing electrochromic devices.

Figure 1:
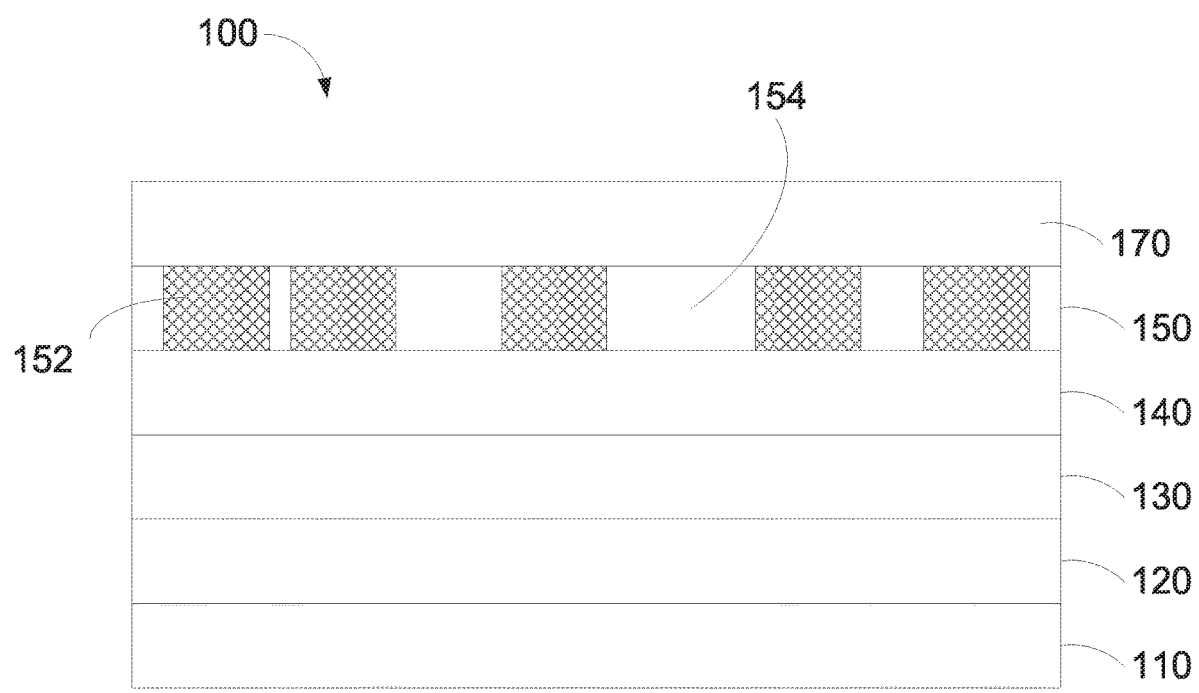
FIG. 1 is a schematic cross-section of an electrochromic device, according to one embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific embodiments and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about," "approximately," or "substantially" is intended to mean that a value of a parameter is close to a stated value or position. However, minor differences may prevent the values or positions from being exactly as stated.

Patterned features, which include bus bars, holes, holes, etc., can have a width, a depth or a thickness, and a length, wherein the length is greater than the width and the depth or thickness. As used in this specification, a diameter is a width for a circle, and a minor axis is a width for an ellipse.

"Impedance parameter" is a measurement the effective resistance—a combined effect of ohmic resistance and electrochemical reactance—of an electrochemical device measured at 2 log (freq/Hz) on a 5×5 cm device with DC bias at −20° C. as 5 mV to 50 mV is applied to the device. The resultant current is measured and impedance and phase angle are computed at each frequency in the range of 100 Hz to 6 MHz.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the glass, vapor deposition, and electrochromic arts.

In accordance with the present disclosure, FIG. 1 illustrates a cross-section view of a partially fabricated electrochemical device 100 having an improved film structure. For purposes of illustrative clarity, the electrochemical device 100 is a variable transmission device. In one embodiment, the electrochemical device 100 can be an electrochromic device. In another embodiment, the electrochemical device 100 can be a thin-film battery. However, it will be recognized that the present disclosure is similarly applicable to other types of scribed electroactive devices, electrochemical devices, as well as other electrochromic devices with different stacks or film structures (e.g., additional layers). Additionally, the electroactive devices can be incorporated into an automobile, window, façade, exterior of a building, transport vehicle, train, or mirror. With regard to the electrochemical device 100 of FIG. 1, the device 100 may include a substrate 110 and a stack overlying the substrate 110. The stack may include a first transparent conductor layer 120, a cathodic electrochemical layer 130, an anodic electrochemical layer 140, and a second transparent conductor layer 150. The device 100 may also include an insulating layer 170. In one embodiment, the stack may also include an ion conducting layer between the cathodic electrochemical layer 130 and the anodic electrochemical layer 140.

In an embodiment, the substrate 110 can include a glass substrate, a sapphire substrate, an aluminum oxynitride substrate, or a spinel substrate. In another embodiment, the substrate 110 can include a transparent polymer, such as a polyacrylic compound, a polyalkene, a polycarbonate, a polyester, a polyether, a polyethylene, a polyimide, a polysulfone, a polysulfide, a polyurethane, a polyvinylacetate, another suitable transparent polymer, or a co-polymer of the foregoing. The substrate 110 may or may not be flexible. In a particular embodiment, the substrate 110 can be float glass or a borosilicate glass and have a thickness in a range of 0.5 mm to 12 mm thick. The substrate 110 may have a thickness no greater than 16 mm, such as 12 mm, no greater than 10 mm, no greater than 8 mm, no greater than 6 mm, no greater than 5 mm, no greater than 3 mm, no greater than 2 mm, no greater than 1.5 mm, no greater than 1 mm, or no greater than 0.01 mm. In another particular embodiment, the substrate 110 can include ultra-thin glass that is a mineral glass having a thickness in a range of 50 microns to 300 microns. In a particular embodiment, the substrate 110 may be used for many different electrochemical devices being formed and may be referred to as a motherboard.

Transparent conductive layers 120 and 150 can include a conductive metal oxide or a conductive polymer. Examples can include a tin oxide or a zinc oxide, either of which can be doped with a trivalent element, such as Al, Ga, In, or the like, a fluorinated tin oxide, or a sulfonated polymer, such as polyaniline, polypyrrole, poly(3,4-ethylenedioxythiophene), or the like. In another embodiment, the transparent conductive layers 120 and 150 can include gold, silver, copper, nickel, aluminum, or any combination thereof. The transparent conductive layers 120 and 150 can include indium oxide, indium tin oxide, doped indium oxide, tin oxide, doped tin oxide, zinc oxide, doped zinc oxide, ruthenium oxide, doped ruthenium oxide and any combination thereof. The transparent conductive layers 120 and 150 can have the same or different compositions. In one embodiment, the transparent conductive layer 150 over the anodic electrochemical layer 140 can have a first resistivity and a second resistivity without removing material from the active stack. In one embodiment, the transparent conductive layer 150 can have a pattern wherein a first part of the pattern 152 corresponds to the first resistivity and the second part of the pattern 154 corresponds to the second resistivity. The first part of the pattern 152 and the second part of the pattern 154 can be the same material. In one embodiment, the first part of the pattern 152 has been altered by a short pulse laser to increase the resistivity. In one embodiment, the first resistivity is greater than the second resistivity. In another embodiment, the first resistivity is less than the second resistivity. The first part of the pattern and the second part of the pattern come from altering the second transparent conductive layer 150 as described in more detail below.

The transparent conductive layers 120 and 150 can have a thickness between 10 nm and 600 nm. In one embodiment, the transparent conductive layers 120 and 150 can have a thickness between 200 nm and 500 nm. In one embodiment, the transparent conductive layers 120 and 150 can have a thickness between 320 nm and 460 nm. In one embodiment the first transparent conductive layer 120 can have a thickness between 10 nm and 600 nm. In one embodiment, the second transparent conductive layer 150 can have a thickness between 80 nm and 600 nm.

The layers 130 and 140 can be electrode layers, wherein one of the layers may be a cathodic electrochemical layer, and the other of the layers may be an anodic electrochromic layer (also referred to as a counter electrode layer). In one embodiment, the cathodic electrochemical layer 130 is an electrochromic layer. The cathodic electrochemical layer 130 can include an inorganic metal oxide material, such as $WO_3$, $V_2O_5$, $MoO_3$, $Nb_2O_5$, $TiO_2$, $CuO$, $Ni_2O_3$, $NiO$, $Ir_2O_3$, $Cr_2O_3$, $Co_2O_3$, $Mn_2O_3$, mixed oxides (e.g., W—Mo oxide, W—V oxide), or any combination thereof and can have a thickness in a range of 40 nm to 600 nm. In one embodiment, the cathodic electrochemical layer 130 can have a thickness between 100 nm to 400 nm. In one embodiment, the cathodic electrochemical layer 130 can have a thickness between 350 nm to 390 nm. The cathodic electrochemical layer 130 can include lithium, aluminum, zirconium, phosphorus, nitrogen, fluorine, chlorine, bromine, iodine, astatine, boron; a borate with or without lithium; a tantalum oxide with or without lithium; a lanthanide-based material with or without lithium; another lithium-based ceramic material; or any combination thereof.

The anodic electrochromic layer 140 can include any of the materials listed with respect to the cathodic electrochromic layer 130 or $Ta_2O_5$, $ZrO_2$, $HfO_2$, $Sb_2O_3$, or any combination thereof, and may further include nickel oxide (NiO, $Ni_2O_3$, or combination of the two), and Li, Na, H, or another ion and have a thickness in a range of 40 nm to 500 nm. In one embodiment, the anodic electrochromic layer 140 can have a thickness between 150 nm to 300 nm. In one embodiment, the anodic electrochromic layer 140 can have a thickness between 250 nm to 290 nm. In some embodiments, lithium may be inserted into at least one of the first electrode 130 or second electrode 140.

In another embodiment, the device 100 may include a plurality of layers between the substrate 110 and the first transparent conductive layer 120. In one embodiment, an antireflection layer can be between the substrate 110 and the first transparent conductive layer 120. The antireflection layer can include $SiO_2$, $NbO_2$, $Nb_2O_5$ and can be a thickness between 20 nm to 100 nm. The device 100 may include at least two bus bars with one bus bar electrically connected to the first transparent conductive layer 120 and the second bus bar electrically connected to the second transparent conductive layer 150.

Figure 2A:
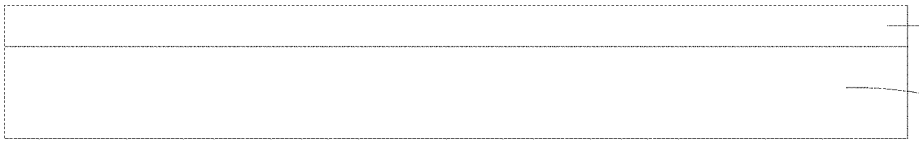
FIGS. 2A-2G are schematic cross-sections of an electrochemical at various stages of manufacturing in accordance with an embodiment of the present disclosure.
Figure 2B:
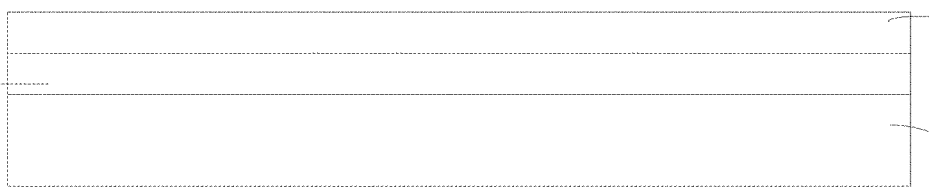
Figure 2C:
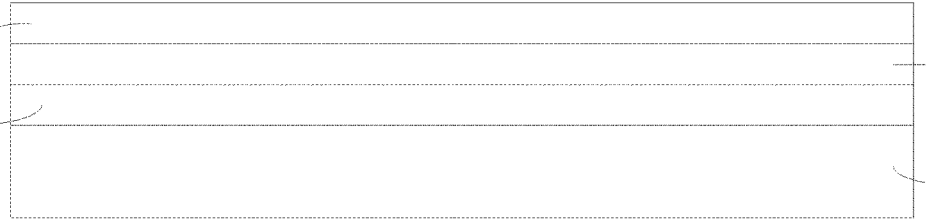
Figure 2D:
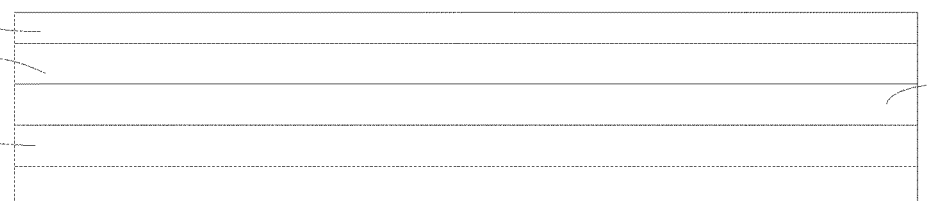
Figure 2E:
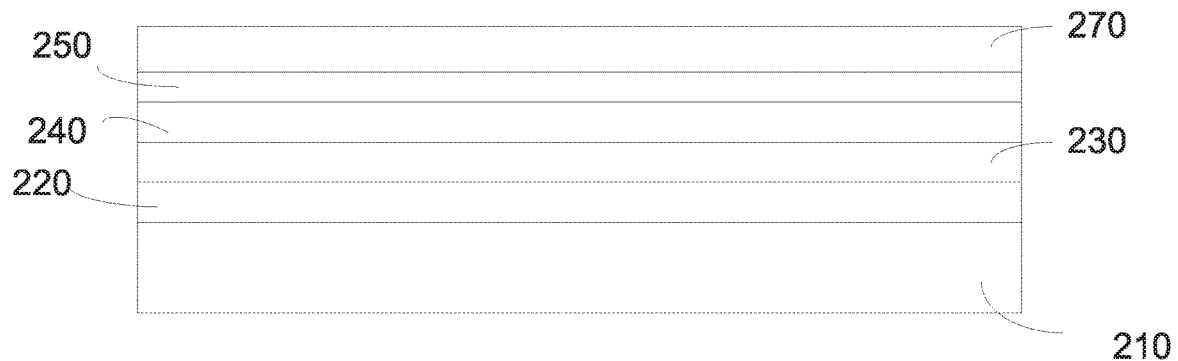
Figure 3:
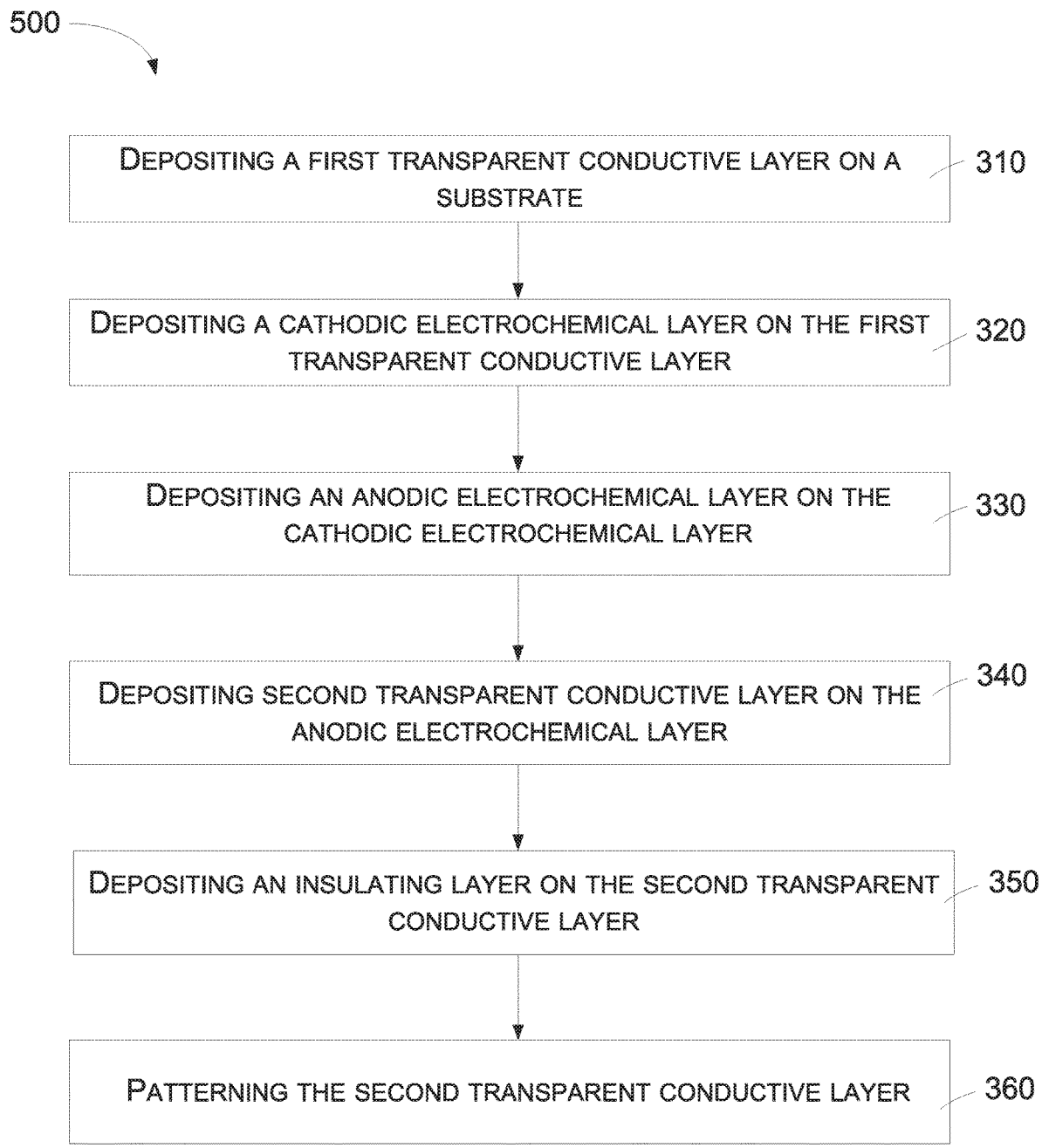
FIG. 3 is a flow chart depicting a process for forming an electrochemical device in accordance with an embodiment of the current disclosure.

FIG. 3 is a flow chart depicting a process 300 for forming an electrochromic device in accordance with an embodiment of the current disclosure. FIGS. 2A-2E are a schematic cross-section of an electrochromic device 200 at various stages of manufacturing in accordance with an embodiment of the present disclosure. The electrochromic device 200 can be the same as the electrochromic device 100 described above. The process can include providing a substrate 210. The substrate 210 can be similar to the substrate 110 described above. At operation 310, a first transparent conductive layer 220 can be deposited on the substrate 210, as seen in FIG. 2A. The first transparent conductive layer 220 can be similar to the first transparent conductive layer 120 described above. In one embodiment, the deposition of the first transparent conductive layer 220 can be carried out by sputter deposition at a power of between 5 kW and 20 kW, at a temperature between 200° C. and 400° C., in a sputter gas including oxygen and argon at a rate between 0.1 m/min and 0.5 m/min. In one embodiment, the sputter gas includes between 40% and 80% oxygen and between 20% and 60% argon. In one embodiment, the sputter gas includes 50% oxygen and 50% argon. In one embodiment, the temperature of sputter deposition can be between 250° C. and 350° C. In one embodiment, the first transparent conductive layer 220 can be carried out by sputter deposition at a power of between 10 kW and 15 kW.

In one embodiment, an intermediate layer can be deposited between the substrate 210 and the second transparent conductive layer 220. In an embodiment, the intermediate layer can include an insulating layer such as an antireflective layer. The antireflective layer can include a silicon oxide, niobium oxide, or any combination thereof. In a particular embodiment, the intermediate layers can be an antireflective layer that can be used to help reduce reflection. The antireflective layer may have an index of refraction between the underlying layers (refractive index of the underlying layers can be approximately 2.0) and clean, dry air or an inert gas, such as Ar or N2 (many gases have refractive indices of approximately 1.0). In an embodiment, the antireflective layer may have a refractive index in a range of 1.4 to 1.6. The antireflective layer can include an insulating material having a suitable refractive index. In a particular embodiment, the antireflective layer may include silica. The thickness of the antireflective layer can be selected to be thin and provide the sufficient antireflective properties. The thickness for the antireflective layer can depend at least in part on the refractive index of the electrochromic layer 130 and counter electrode layer 140. The thickness of the intermediate layer can be in a range of 20 nm to 100 nm.

At operation 320 and as seen in FIG. 2B, an electrochromic layer 230 may be deposited on the first transparent conductive layer 220. The electrochromic layer 230 can be similar to the electrochromic layer 130 described above. In one embodiment, the deposition of the electrochromic layer 230 may be carried out by sputter deposition of tungsten, at a temperature between 23° C. and 400° C., in a sputter gas including oxygen and argon. In one embodiment, the sputter gas includes between 40% and 80% oxygen and between 20% and 60% argon. In one embodiment, the sputter gas includes 50% oxygen and 50% argon. In one embodiment, the temperature of sputter deposition is between 100° C. and 350° C. In one embodiment, the temperature of sputter deposition is between 200° C. and 300° C. An additionally deposition of tungsten may be sputter deposited in a sputter gas that includes 100% oxygen.

At operation 330 and as seen in FIG. 2C, an anodic electrochemical layer 240 may be deposited on the cathodic electrochemical layer 230. In one embodiment, the anodic electrochemical layer 240 can be a counter electrode. The anodic electrochemical layer 240 can be similar to the anodic electrochemical layer 140 described above. In one embodiment, the deposition of the anodic electrochemical layer 240 may be carried out by sputter deposition of tungsten, nickel, and lithium, at a temperature between 20° C. and 50° C., in a sputter gas including oxygen and argon. In one embodiment, the sputter gas includes between 60% and 80% oxygen and between 20% and 40% argon. In one embodiment, the temperature of sputter deposition is between 22° C. and 32° C.

At operation 340 and as seen in FIG. 2D, a second transparent conductive layer 250 may be deposited on the anodic electrochemical layer 240. The second transparent conductive layer 250 can be similar to the second transparent conductive layer 150 described above. In one embodiment, the deposition of the second transparent conductive layer 250 may be carried out by sputter deposition at a power of between 5 kW and 20 kW, at a temperature between 20° C. and 50° C., in a sputter gas including oxygen and argon. In one embodiment, the sputter gas includes between 1% and 10% oxygen and between 90% and 99% argon. In one embodiment, the sputter gas includes 8% oxygen and 92% argon. In one embodiment, the temperature of sputter deposition is between 22° C. and 32° C. In one embodiment, after depositing the second transparent conductive layer 250, the substrate 210, first transparent conductive layer 220, the cathodic electrochemical layer 230, the anodic electrochemical layer 240, and the second transparent conductive layer 250 may be heated a at a temperature between 300° C. and 500° C. for between 2 min and 10 min.

At operation 350, additional layers may be deposited on the second transparent conductive layer 250. In one embodiment, the additional layer 270 may include an insulating layer similar to the insulating layer 170, as seen in FIG. 2E. In one embodiment, the insulating layer may include silica ($SiO_2$). In one embodiment, the additional layer 270 may include a high resistance transparent conductive layer and an insulating layer. Following the deposition of the insulating layer, the device 200 can be considered a laminated active stack.

Figure 2F:
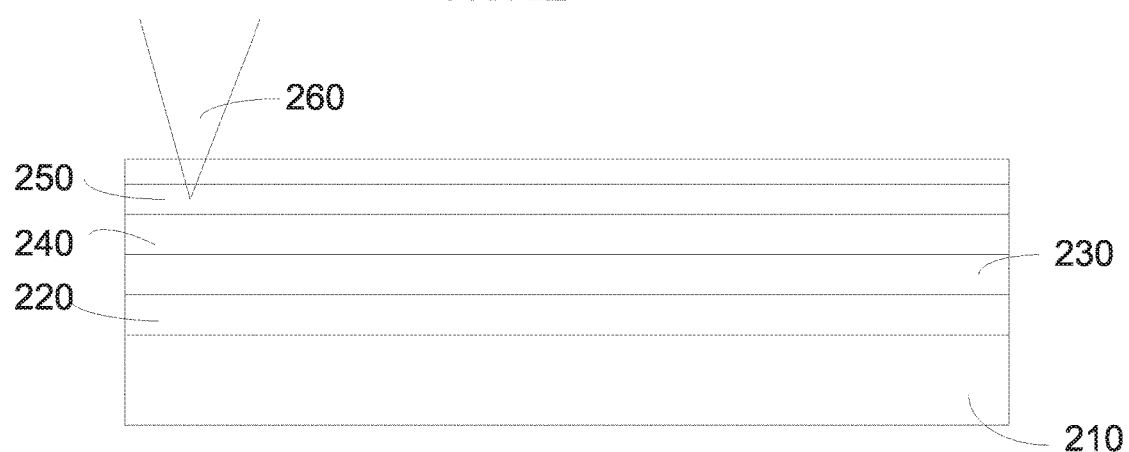

Following the deposition of the stack above, a pattern may be determined. The pattern can include a first region and a second region. The first region may have a first resistivity and the second region may have a second resistivity. At operation 360 and as seen in FIG. 2F, the second transparent conductive layer 250 can be patterned. In one embodiment, a short pulse laser 260 having a wavelength between 400 nm and 700 nm is directed through the insulating layer 270 to pattern the second transparent conductive layer 250. In one embodiment, the short pulse laser 260 having a wavelength between 500 nm and 550 nm is directed through the top of the stack to pattern the second transparent conductive layer 250. The wavelength and duration of the laser 260 are selected to prevent a build up of heat within the device 200. In one embodiment, the insulating layer 270 remains unaffected while the first transparent conductive layer 220 can be patterned. In an embodiment including layers between the insulating layer 270 and the second transparent conductive layer 250, the short pulse laser 260 can be directed through the insulating layer 270 and the subsequent layers until reaching and patterning the second transparent conductive layer 250. Patterning the second transparent conductive layer 250 can be done while maintaining the insulating layer 270, substrate 210, the cathodic electrochemical layer 230, the anodic electrochemical layer 240, and the first transparent conductive layer 220 intact. In another embodiment, the laser 260 may be directed to pattern the second transparent conductive layer 250 by directing the laser beam through the substrate 210, first transparent conductive layer 220, the cathodic electrochemical layer 230, and the anodic electrochemical layer 240 until reaching the second transparent conducive layer 250 without affecting any of the other layers.

Figure 2G:
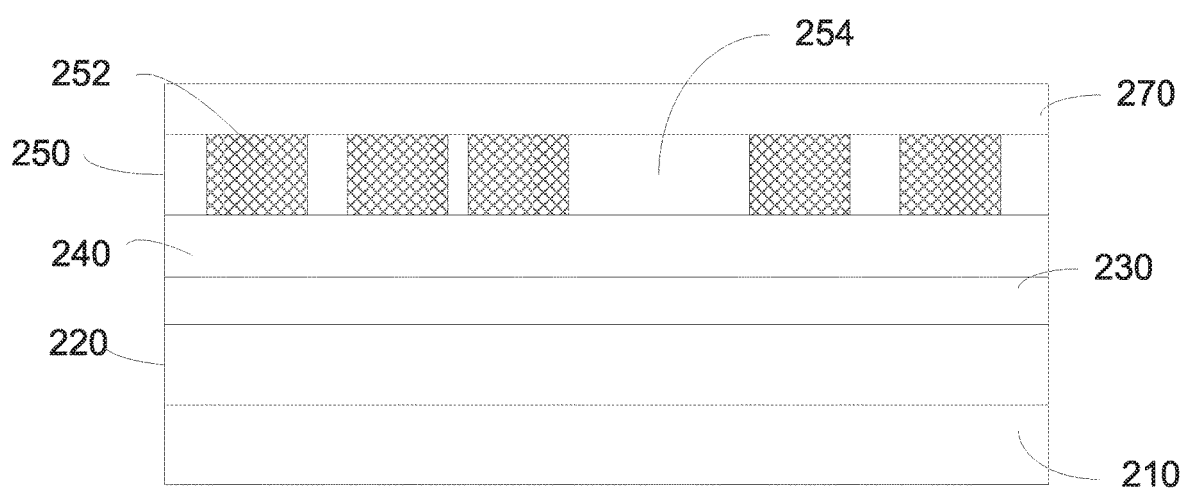

In one embodiment, the short pulse laser 260 may have a wavelength between 500 nm and 550 nm. In one embodiment, the short pulse laser 260 fires for a duration of between 50 femtoseconds and 1 second. The wavelength of the laser 260 may be selected so that the energy of the laser 260 is absorbed by the second transparent conductive layer 250 as compared to the insulating layer 270 or any other layers in the active stack. In one embodiment, the short pulse laser 260 can be moved across the device 200 to form a pattern. In one embodiment, the pattern can include a first resistivity and a second resistivity. The short pulse laser 260 may transform the material of the second transparent conductive layer 250 to change the resistivity without removing any material from the stack. In other words, the short pulse laser 260 targets a first region corresponding to the pattern determined, to change the resistivity of that region while the remainder of the first transparent conductive layer remains the same. The resulting pattern, as seen in FIG. 2G, then can include a first resistivity and a second resistivity. Before patterning, the second transparent conductive layer 250 can have a uniform resistivity. After patterning, the second transparent conductive layer 250 can have a pattern including a first resistivity and a second resistivity. In one embodiment, the first region 252 can have the first resistivity and the second region 254 can have the second resistivity. In one embodiment, the first region 252 and the second region 254 can have the same composition of materials. In one embodiment, the first resistivity is greater than the second resistivity. In one embodiment, the first resistivity is less than the second resistivity. In one embodiment the first resistivity can be between 15 Ω/sq to 100 Ω/sq. In one embodiment, the second transparent conductive layer 250 can include the first and second resistivities while the first transparent conductive layer 220 can include a single resistivity. Patterning the device after all the layers have been deposited on the substrate 210 reduces manufacturing costs. Patterning the transparent conductive layer after all the layers have been deposited on the substrate creates areas of high and low resistivity in the transparent conductive layer. The laser contacts the region of the transparent conductive layer to be patterned and increases the resistivity of that region. In doing so, the pattern used can help determine the resistance at various points across the device to produce a more homogeneous switching. Specifically, the patterned device has a more uniform, homogeneous, and fast transition as seen from center-to-edge of a device as the device transitions from clear to colored state. As the selective pattern reduces the difference in resistance from the center to the edge, the same patterned transparent conductive layer shows improved holding uniformity, as illustrated in the examples section below. The uniformity in holding become more apparent as the device gets larger or the distance between bus bars increases.

Figure 4A:
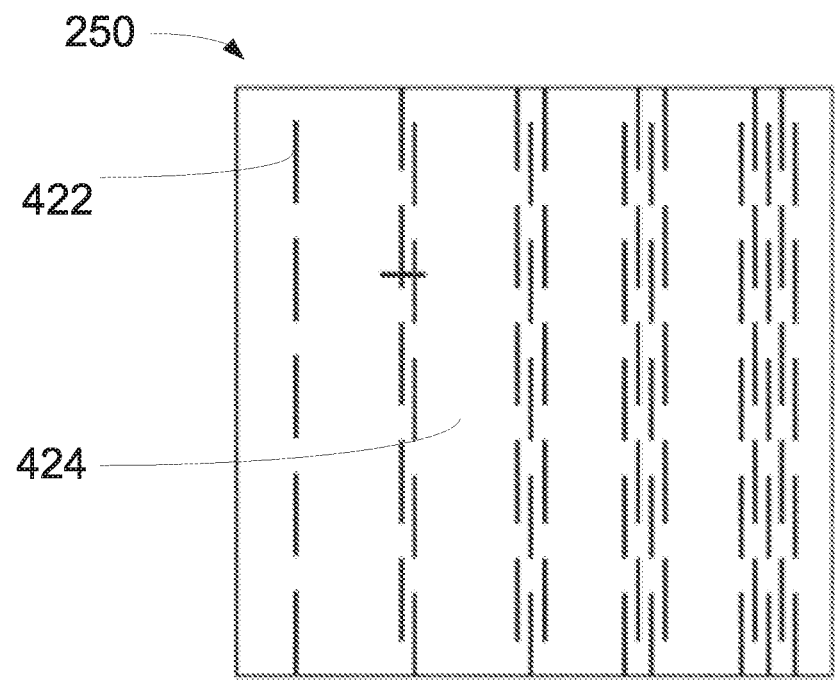
FIGS. 4A-4B are schematic illustrations of a top view of the transparent conductive layer, according to various embodiments.
Figure 4B:
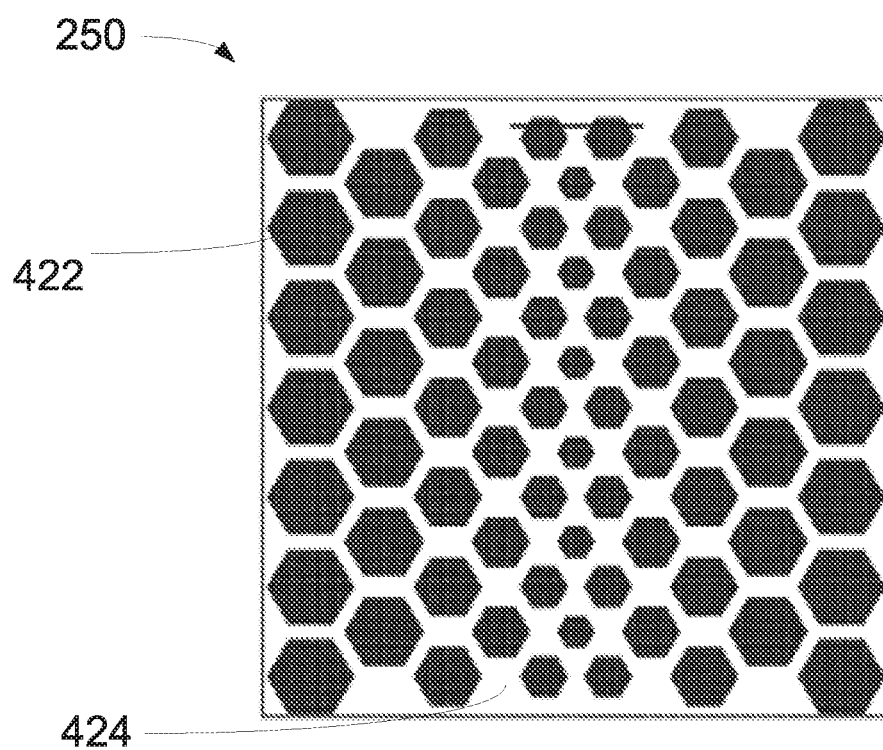

FIGS. 4A-4B are schematic illustrations of a top view of the second transparent conductive layer 250, according to various embodiments. The second transparent conductive layer 250 can have a pattern including a first region 422 and a second 424. In one embodiment, the first region 422 can have the first resistivity and the second region 424 can have the second resistivity. In one embodiment, the pattern can vary across the second transparent conductive layer 250. In one embodiment, the pattern can include geometric shapes. In one embodiment, the pattern can decrease in size towards the center of the second transparent conductive layer 250 and increase in size towards opposite ends of the second transparent conductive layer 250. In one embodiment, the first region 422 may be less than the second region 424, as seen in FIG. 4A. In another embodiment, the first region 422 may be greater than the second region 424, as seen in FIG. 2B. In one embodiment, the first region 422 may be graduated to increase from one edge of the first transparent conductive layer 220 to the opposite edge of the second transparent conductive layer 250. The first region 422 may be circular, square, rectangular, linear, hexagonal, polygonal, triangular in shape, or any combination therein.

Figure 5:
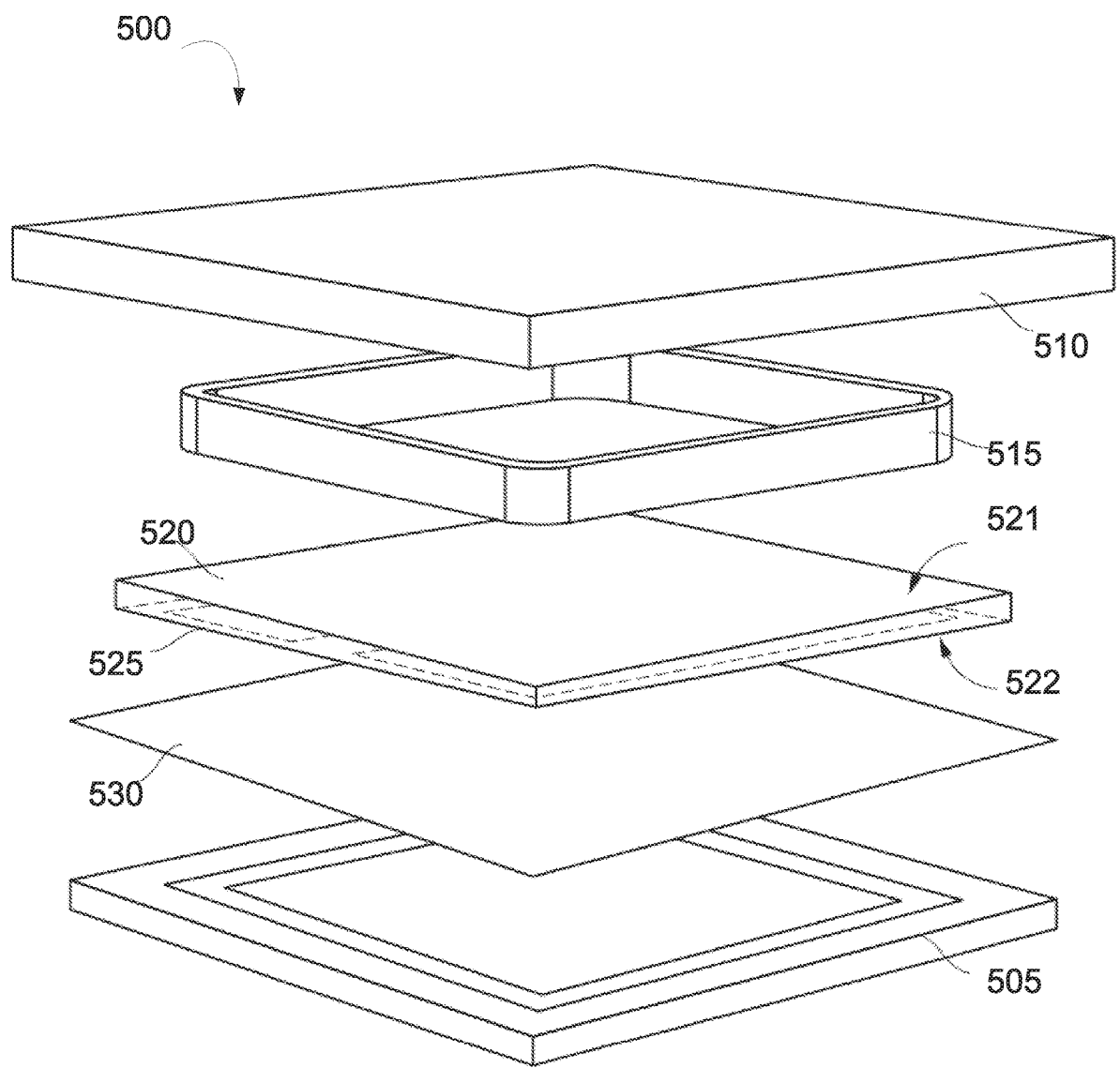
FIG. 5 is a schematic illustration of an insulated glazing unit according to an embodiment of the current disclosure.

Any of the electrochemical devices can be subsequently processed as a part of an insulated glass unit. FIG. 5 is a schematic illustration of an insulated glazing unit 500 according the embodiment of the current disclosure. The insulated glass unit 500 can include a first panel 505, an electrochemical device 520 coupled to the first panel 505, a second panel 510, and a spacer 515 between the first panel 505 and second panel 510. The first panel 505 can be a glass panel, a sapphire panel, an aluminum oxynitride panel, or a spinel panel. In another embodiment, the first panel can include a transparent polymer, such as a polyacrylic compound, a polyalkene, a polycarbonate, a polyester, a polyether, a polyethylene, a polyimide, a polysulfone, a polysulfide, a polyurethane, a polyvinylacetate, another suitable transparent polymer, or a co-polymer of the foregoing. The first panel 505 may or may not be flexible. In a particular embodiment, the first panel 505 can be float glass or a borosilicate glass and have a thickness in a range of 2 mm to 20 mm thick. The first panel 505 can be a heat-treated, heat-strengthened, or tempered panel. In one embodiment, the electrochemical device 520 is coupled to first panel 505. In another embodiment, the electrochemical device 520 is on a substrate 525 and the substrate 525 is coupled to the first panel 505. In one embodiment, a lamination interlayer 530 may be disposed between the first panel 505 and the electrochemical device 520. In one embodiment, the lamination interlayer 530 may be disposed between the first panel 505 and the substrate 525 containing the electrochemical device 520. The electrochemical device 520 may be on a first side 521 of the substrate 525 and the lamination interlayer 530 may be coupled to a second side 522 of the substrate. The first side 521 may be parallel to and opposite from the second side 522.

The second panel 510 can be a glass panel, a sapphire panel, an aluminum oxynitride panel, or a spinel panel. In another embodiment, the second panel can include a transparent polymer, such as a polyacrylic compound, a polyalkene, a polycarbonate, a polyester, a polyether, a polyethylene, a polyimide, a polysulfone, a polysulfide, a polyurethane, a polyvinylacetate, another suitable transparent polymer, or a co-polymer of the foregoing. The second panel may or may not be flexible. In a particular embodiment, the second panel 510 can be float glass or a borosilicate glass and have a thickness in a range of 5 mm to 30 mm thick. The second panel 510 can be a heat-treated, heat-strengthened, or tempered panel. In one embodiment, the spacer 515 can be between the first panel 505 and the second panel 510. In another embodiment, the spacer 515 is between the substrate 525 and the second panel 510. In yet another embodiment, the spacer 515 is between the electrochemical device 520 and the second panel 510.

In another embodiment, the insulated glass unit 500 can further include additional layers. The insulated glass unit 500 can include the first panel, the electrochemical device 520 coupled to the first panel 505, the second panel 510, the spacer 515 between the first panel 505 and second panel 510, a third panel, and a second spacer between the first panel 505 and the second panel 510. In one embodiment, the electrochemical device may be on a substrate. The substrate may be coupled to the first panel using a lamination interlayer. A first spacer may be between the substrate and the third panel. In one embodiment, the substrate is coupled to the first panel on one side and spaced apart from the third panel on the other side. In other words, the first spacer may be between the electrochemical device and the third panel. A second spacer may be between the third panel and the second panel. In such an embodiment, the third panel is between the first spacer and second spacer. In other words, the third panel is couple to the first spacer on a first side and coupled to the second spacer on a second side opposite the first side.

The embodiments described above and illustrated in the figures are not limited to rectangular shaped devices. Rather, the descriptions and figures are meant only to depict cross-sectional views of a device and are not meant to limit the shape of such a device in any manner. For example, the device may be formed in shapes other than rectangles (e.g., triangles, circles, arcuate structures, etc.). For further example, the device may be shaped three-dimensionally (e.g., convex, concave, etc.).

Many different aspects and embodiments are possible. Some of those aspects and embodiments are described below. After reading this specification, skilled artisans will appreciate that those aspects and embodiments are only illustrative and do not limit the scope of the present invention. Exemplary embodiments may be in accordance with any one or more of the ones as listed below.

Embodiment 1

A method of forming an electrochemical device, the method can include providing a substrate and a stack overlying the substrate. The stack can include a first transparent conductive layer over the substrate, a cathodic electrochemical layer over the first transparent conductive layer, an anodic electrochemical layer over the electrochromic layer, and a second transparent conductive layer overlying the anodic electrochemical layer. The method can also include depositing an insulating layer over the stack and determining a first pattern for the second transparent conductive layer. The first pattern can include a first region and a second region. The first region and the second region can be the same material. The method can also include patterning the first region of the second transparent conductive layer without removing the material from the first region. After patterning, the first region can have a first resistivity and the second region can have a second resistivity.

Embodiment 2

The method of embodiment 1, wherein patterning the second transparent conductive layer to form the first resistivity and the second resistivity can be patterned through the substrate.

Embodiment 3

The method of embodiment 1, wherein patterning the second transparent conductive layer to form the first resistivity and the second resistivity can be patterned after forming the active stack.

Embodiment 4

The method of embodiment 1, wherein patterning the second transparent conductive layer comprises using a short pulse laser having a wavelength between 400 nm and 700 nm.

Embodiment 5

The method of embodiment 1, wherein the short pulse laser have a wavelength between 500 nm and 550 nm.

Embodiment 6

The method of embodiment 1, wherein the short pulse laser fires for a duration of between 50 femtoseconds and 1 second.

Embodiment 7

The method of embodiment 1, wherein the first resistivity is greater than the second resistivity.

Embodiment 8

The method of embodiment 1, wherein the first resistivity is between 15 $\Omega$/sq to 100 $\Omega$/sq.

Embodiment 9

The method of embodiment 1, wherein the substrate comprises glass, sapphire, aluminum oxynitride, spinel, polyacrylic compound, polyalkene, polycarbonate, polyester, polyether, polyethylene, polyimide, polysulfone, polysulfide, polyurethane, polyvinylacetate, another suitable transparent polymer, co-polymer of the foregoing, float glass, borosilicate glass, or any combination thereof.

Embodiment 10

The method of embodiment 1, wherein the stack further comprises an ion conducting layer between the cathodic electrochemical layer and the anodic electrochemical layer.

Embodiment 11

The method of embodiment 10, wherein the ion-conducting layer comprises lithium, sodium, hydrogen, deuterium, potassium, calcium, barium, strontium, magnesium, oxidized lithium, $Li_2WO_4$, tungsten, nickel, lithium carbonate, lithium hydroxide, lithium peroxide, or any combination thereof.

Embodiment 12

The method of embodiment 1, wherein the cathodic electrochemical layer comprises an electrochromic material.

Embodiment 13

The method of embodiment 12, wherein the electrochromic material comprises $WO_3$, $V_2O_5$, $MoO_3$, $Nb_2O_5$, $TiO_2$, $CuO$, $Ni_2O_3$, $NiO$, $Ir_2O_3$, $Cr_2O_3$, $CO_2O_3$, $Mn_2O_3$, mixed oxides (e.g., W—Mo oxide, W—V oxide), lithium, aluminum, zirconium, phosphorus, nitrogen, fluorine, chlorine, bromine, iodine, astatine, boron, a borate with or without lithium, a tantalum oxide with or without lithium, a lanthanide-based material with or without lithium, another lithium-based ceramic material, or any combination thereof.

Embodiment 14

The method of embodiment 1, wherein the first transparent conductive layer comprises indium oxide, indium tin oxide, doped indium oxide, tin oxide, doped tin oxide, zinc oxide, doped zinc oxide, ruthenium oxide, doped ruthenium oxide, silver, gold, copper, aluminum, and any combination thereof.

Embodiment 15

The method of embodiment 1, wherein the second transparent conductive layer comprises indium oxide, indium tin oxide, doped indium oxide, tin oxide, doped tin oxide, zinc oxide, doped zinc oxide, ruthenium oxide, doped ruthenium oxide and any combination thereof.

Embodiment 16

The method of embodiment 1, wherein the anodic electrochemical layer comprises a an inorganic metal oxide electrochemically active material, such as $WO_3$, $V_2O_5$, $MoO_3$, $Nb_2O_5$, $TiO_2$, $CuO$, $Ir_2O_3$, $Cr_2O_3$, $Co_2O_3$, $Mn_2O_3$, $Ta_2O_5$, $ZrO_2$, $HfO_2$, $Sb_2O_3$, a lanthanide-based material with or without lithium, another lithium-based ceramic material, a nickel oxide (NiO, $Ni_2O_3$, or combination of the two), and Li, nitrogen, Na, H, or another ion, any halogen, or any combination thereof.

Embodiment 17

The method of embodiment 1, wherein patterning the second transparent conductive layer to form the first resistivity and the second resistivity is patterned through the substrate, the first transparent conductive layer, the cathodic electrochemical layer, and the anodic electrochemical layer.

Embodiment 18

An electrochemical device including a substrate and a first transparent conductive layer over the substrate and a second transparent conductive layer. The second transparent conductive layer comprises a material, and the material has a first resistivity and a second resistivity. The electrochemical device can also include an anodic electrochemical layer between the first transparent conductive layer and the second transparent conductive layer, and a cathodic electrochemical layer between the first transparent conductive layer and the second transparent conductive layer.

Embodiment 19

The electrochemical device of embodiment 18, wherein no material is removed from the second transparent conductive layer.

Embodiment 20

An insulated glazing unit may include a first panel and an electrochemical device coupled to the first panel. The electrochemical device may include a substrate and a first transparent conductive layer disposed on the substrate. The electrochemical device may also include a cathodic electrochemical layer overlying the first transparent conductive layer, an anodic electrochemical layer overlying the cathodic electrochemical layer, and a second transparent conductive layer. The second transparent conductive layer comprises a material and the material has a first resistivity and a second resistivity. The insulated glazing unit may also include a second panel, and a spacer frame disposed between the first panel and the second panel.

Embodiment 21

The insulated glazing unit of embodiment 20, wherein the electrochemical device is between the first panel and the second panel.

Examples

An example is provided to demonstrate the performance of an electrochemical device with a patterned transparent conductive layer as compared to other electrochemical devices without patterned layers. For the various examples below, sample 1 (S1) was formed in accordance to the various embodiments described above. Comparative sample, Sample 2 (S2) is understood to be an embodiment without a patterned transparent conductive layer.

Figure 6:
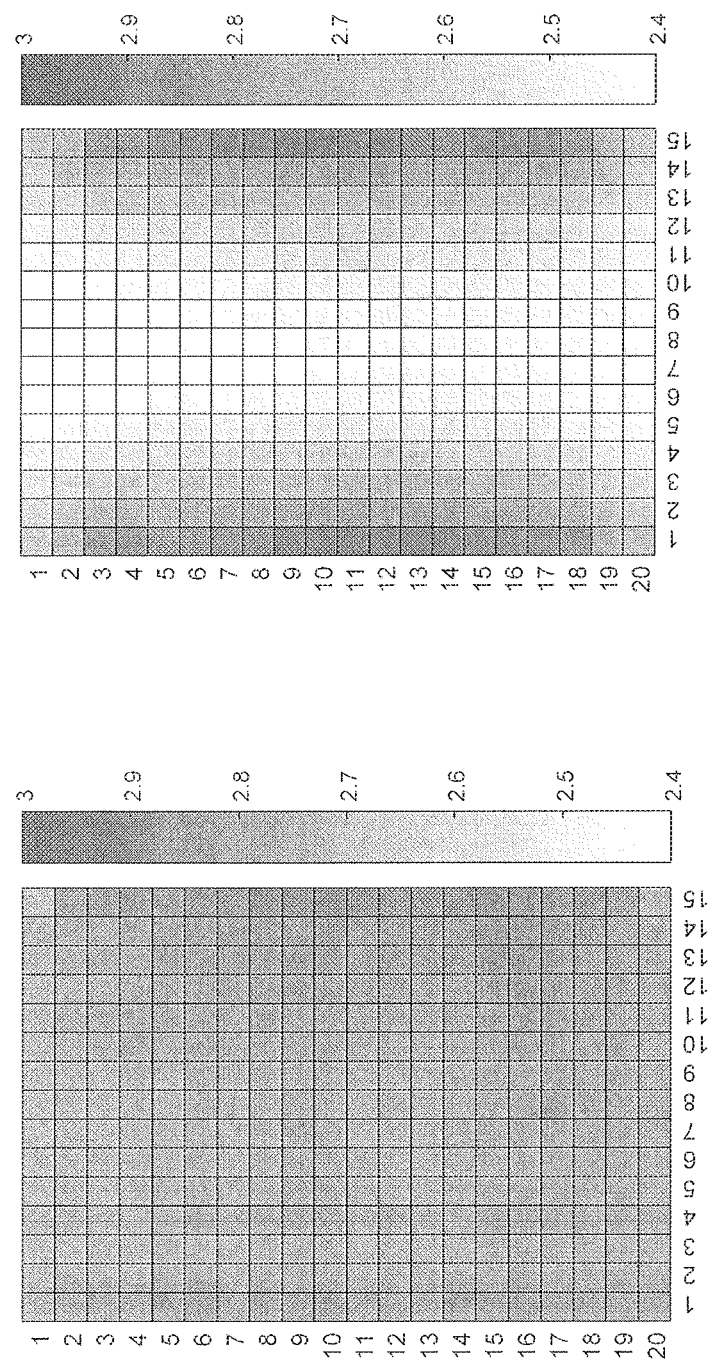
FIG. 6 is a graph of the holding voltages of various samples.

FIG. 6 is a graph of the holding voltages of various samples S1 and S2. The illustration in FIG. 6 shows the samples at a held voltage as the sample transitions from clear to tint. As can be seen in FIG. 5, S1 has a homogenous pattern while S2 a varying pattern. The center-to-edge difference during holding has been reduced by >80% for the Si sample. The S2 sample has varying transmission states. The Si same has a homogenous transmission state.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:
1. A method of forming an electrochemical device, the method comprising:
   providing a substrate and a stack overlying the substrate, the stack comprising:
      a first transparent conductive layer over the substrate;
      a second transparent conductive layer over the substrate;
      a cathodic electrochemical layer between the first transparent conductive layer and the second transparent conductive layer; and an anodic electrochemical layer between the first transparent conductive layer and the second transparent conductive layer;

determining a first pattern for the second transparent conductive layer, wherein the first pattern comprises a first region and a second region, wherein the first region and the second region comprise the same material; and patterning the first region of the second transparent conductive layer without removing the material from the first region, wherein after patterning the first region, the first region comprises a first resistivity and the second region comprises a second resistivity, and wherein patterning the second transparent conductive layer to form the first resistivity and the second resistivity is patterned through the insulating layer.

2. The method of claim 1, wherein patterning the second transparent conductive layer to form the first resistivity and the second resistivity is patterned through the substrate, the first transparent conductive layer, the cathodic electrochemical layer, and the anodic electrochemical layer.

3. The method of claim 1, wherein patterning the second transparent conductive layer comprises using a short pulse laser having a wavelength between 400 nm and 700 nm.

4. The method of claim 3, wherein the short pulse laser has a wavelength between 500 nm and 550 nm.

5. The method of claim 3, wherein the short pulse laser fires for a duration of between 50 femtoseconds and 1 second.

6. The method of claim 1, wherein the first resistivity is greater than the second resistivity.

7. The method of claim 1, wherein the first resistivity is between 15 Ω/sq to 100 Ω/sq.

8. The method of claim 1, wherein the substrate comprises a material selected from the group consisting of glass, sapphire, aluminum oxynitride, spinel, polyacrylic compound, polyalkene, polycarbonate, polyester, polyether, polyethylene, polyimide, polysulfone, polysulfide, polyurethane, polyvinylacetate, another suitable transparent polymer, co-polymer of the foregoing, float glass, borosilicate glass, and any combination thereof.

9. The method of claim 1, wherein the stack further comprises an ion conducting layer between the cathodic electrochemical layer and the anodic electrochemical layer.

10. The method of claim 9, wherein the ion-conducting layer comprises a material selected from the group consisting of lithium, sodium, hydrogen, deuterium, potassium, calcium, barium, strontium, magnesium, oxidized lithium, $Li_2WO_4$, tungsten, nickel, lithium carbonate, lithium hydroxide, lithium peroxide, and any combination thereof.

11. The method of claim 1, wherein the cathodic electrochemical layer comprises an electrochromic material.

12. The method of claim 11, wherein the electrochromic material comprises a material selected from the group consisting of $WO_3$, $V_2O_5$, $MoO_3$, $Nb_2O_5$, $TiO_2$, CuO, $Ni_2O_3$, NiO, $Ir_2O_3$, $Cr_2O_3$, $Co_2O_3$, $Mn_2O_3$, mixed oxides (e.g., W—Mo oxide, W—V oxide), lithium, aluminum, zirconium, phosphorus, nitrogen, fluorine, chlorine, bromine, iodine, astatine, boron, a borate with or without lithium, a tantalum oxide with or without lithium, a lanthanide-based material with or without lithium, another lithium-based ceramic material, or any combination thereof.

13. The method of claim 1, wherein the first transparent conductive layer comprises indium oxide, indium tin oxide, doped indium oxide, tin oxide, doped tin oxide, zinc oxide, doped zinc oxide, ruthenium oxide, doped ruthenium oxide, silver, gold, copper, aluminum, and any combination thereof.

14. The method of claim 1, wherein the second transparent conductive layer comprises a material selected from the group consisting of indium oxide, indium tin oxide, doped indium oxide, tin oxide, doped tin oxide, zinc oxide, doped zinc oxide, ruthenium oxide, doped ruthenium oxide and any combination thereof.

15. The method of claim 1, wherein the anodic electrochemical layer comprises a material selected from the group consisting of an inorganic metal oxide electrochemically active material, such as $WO_3$, $V_2O_5$, $MoO_3$, $Nb_2O_5$, $TiO_2$, CuO, $Ir_2O_3$, $Cr_2O_3$, $Co_2O_3$, $Mn_2O_3$, $Ta_2O_5$, $ZrO_2$, $HfO_2$, $Sb_2O_3$, a lanthanide-based material with or without lithium, another lithium-based ceramic material, a nickel oxide (NiO, $Ni_2O_3$, or combination of the two), and Li, nitrogen, Na, H, or another ion, any halogen, and any combination thereof.

16. A method of forming an electrochemical device, the method comprising:

providing a substrate and a stack overlying the substrate, the stack comprising:
a first transparent conductive layer over the substrate;
a second transparent conductive layer over the substrate;
a cathodic electrochemical layer between the first transparent conductive layer and the second transparent conductive layer; and
an anodic electrochemical layer between the first transparent conductive layer and the second transparent conductive layer;

determining a first pattern for the second transparent conductive layer, wherein the first pattern comprises a first region and a second region, wherein the first region and the second region comprise the same material; and patterning the first region of the second transparent conductive layer without removing the material from the first region, wherein after patterning the first region, the first region comprises a first resistivity and the second region comprises a second resistivity, wherein patterning the second transparent conductive layer to form the first resistivity and the second resistivity is patterned after forming the stack.

* * * * *